United States Patent [19]

Miyata et al.

[11] Patent Number: 4,842,645
[45] Date of Patent: Jun. 27, 1989

[54] RUST-PROOFING AGENT, RUST-PROOFING COATING COMPOSITION AND COATING METHOD FOR PREVENTING OR INHIBITING CORROSION OF METALLIC/SURFACE

[75] Inventors: Shigeo Miyata, Takamatsu; Hideo Takahashi, Sakaide, both of Japan

[73] Assignee: Kyowa Chemical Industry Co., Ltd., Tokyo, Japan

[21] Appl. No.: 188,854

[22] Filed: May 2, 1988

[30] Foreign Application Priority Data

May 2, 1987 [JP] Japan ................. 62-109282

[51] Int. Cl.$^4$ ............................................. C04B 9/02
[52] U.S. Cl. .................................. 106/14.14; 106/419; 106/442; 106/444; 252/389.2
[58] Field of Search ................... 106/14.14, 419, 442, 106/444; 252/389.2

[56] References Cited

U.S. PATENT DOCUMENTS

| | | | |
|---|---|---|---|
| 3,241,983 | 3/1966 | Bretz | 106/14.14 |
| 3,583,887 | 6/1971 | Steger et al. | 106/14.14 |
| 3,672,822 | 6/1972 | Vedder et al. | 252/389.2 |
| 4,026,710 | 5/1977 | Kennedy | 106/14.14 |
| 4,352,899 | 10/1982 | Tada et al. | 523/451 |
| 4,651,916 | 10/1986 | Henderson | 427/345 |
| 4,705,703 | 11/1987 | Meier et al. | 252/389.2 |

*Primary Examiner*—Paul Lieberman
*Assistant Examiner*—Willie J. Thompson
*Attorney, Agent, or Firm*—Sherman & Shalloway

[57] ABSTRACT

A rust-proofing agent containing as an active ingredient an oxide solid solution represented by formula (1)

$$[(Zn)_{1-y}(Mg)_y]_{1-x}Al_xO_{1+x/2} \qquad (1)$$

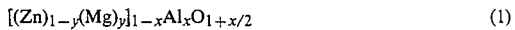

wherein x denotes a positive number satisfying $0.1 < x < 0.6$ and y denotes a positive number satisying $0 < y < 1$, a rust-proofing coating composition containing said rust-proofing agent and a coating method for preventing or inhibiting corrosion of a metallic surface.

17 Claims, No Drawings

RUST-PROOFING AGENT, RUST-PROOFING COATING COMPOSITION AND COATING METHOD FOR PREVENTING OR INHIBITING CORROSION OF METALLIC/SURFACE

This invention relates to a novel rust-proofing agent that prevents or inhibits corrosion occurring on metallic surfaces of iron, zinc, aluminum, magnesium and chrome-plated nickel coated with a resin coating, and a novel coating composition containing said rust-proofing agent. [Prior Art and Problems to be resolved]

When various resin-coated metallic products such as automobiles, furniture, outdoor structures, chemical apparatuses and agricultural machines are placed under high humidity or exposed to wind and rain containing salts such as NaCl, $CaCl_2$ and $MgCl_2$, the metallic surface of the substrate undergoes corrosion. When a slight flaw occurs in the coated product, corrosion is all the more promoted. The occurrence of corrosion results in gradually losing the adhesion between the coated film and the substrate metal and delaminating the coated film.

Accordingly, a coating composition is blended with substances imparting corrosion resistance to the metallic surface being coated.

For example, Japanese Laid-open Patent Application No. 166568/1984 discloses that 100 parts by weight of a film-forming component is blended with 0.5 to 20 parts by weight of hydrotalcite of any one of compositions $Mg_4Al_2(OH)_{12}CO_3\cdot 3H_2O$, $Mg_6Al_2(OH)_{16}CO_3\cdot 5H_2O$ and $Mg_6Al_2(OH)_{16}CO_3\cdot 4H_2O$.

Japanese Laid-open Patent Application No. 152574/1985 discloses that 100 parts by weight of a paint resin is blended with 0.5 to 50 parts by weight of a skin. The skin here referred to is a fibrous clay mineral powder of sepiolite or attapulgite composed mainly of hydrous magnesium silicate, hydrous magnesium and aluminum silicate having a hydroxyl group on the surface.

Japanese Laid-open Patent Application No. 15267/87 discloses that a coating is blended with a calcined mixture containing about 5 to 95 % by weight of magnesium oxide and about 5 to 95 % by weight of zinc oxide.

Japanese Laid-open Patent Application No. 70463/1987 (by the present inventors) discloses that a paint is blended with a hydrotalcite solid solution represented by formula

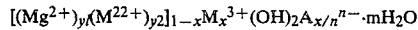

wherein $M_2^{2+}$ denotes at least one divalent metal selected from the group consisting of Zn, Cd, Pb, Ca and Sr, $M_{3+}$ denotes a trivalent metal, $A^{n-}$ denotes an anion having a valence of n, and x, $y_1$, $y_2$ and m denote positive numbers satisfying the following conditions, $0<x\leq 0.5$, $0.5\leq y_1+y_2<1$ and $0\leq m<2$.

Though the above rust-proofing agents exhibit a certain rust-proofing effect, said effect is still insufficient and its improvement has been demanded. [Means for Resolving the Problems]

The present inventors have discovered that the hydrotalcite solid solution of said Japanese Laid-open Patent Application No. 70463/87 shows relatively good rust-proofing effect among ordinary rust-proofing agents. The main reason is considered to be that the hydrotalcite solid solution has excellent performance of entrapping Cl ions causing corrosion into its structure by an anionic exchange reaction to completely inactivate them. The present inventors have therefore extensively studied compounds capable of inactivating more Cl ions than the hydrotalcite solid solution. As a result, they have found that when a divalent metallic oxide having Al dissolved therein, represented by formula (1)

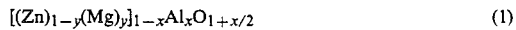

wherein x denotes a positive number satisfying $0.1<x<0.6$ and y denotes a positive number satisfying $0<y<1$, is contained in a coating, corrosion resistance of the metallic surface is markedly improved.

The reason is considered to be that the oxide solid solution represented by formula (1) is active to both Na ions and Cl ions which cause corrosion and the activity is high. [Concrete Explanation of the Construction]

The novel rust-proofing agent of this invention contains as an active ingredient an oxide solid solution represented by formula (1)

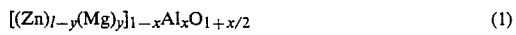

wherein x denotes a positive number satisfying $0.1<x<0.6$ and y denotes a positive number satisfying $0<y<1$.

In the rust-proofing coating composition of this invention, the amount of the oxide solid solution represented by formula (1) is about 0.1 to 30 parts by weight, preferably about 1 to 10 parts by weight, per 100 parts by weight of the film-forming component of the resin coating. Where the amount of the oxide solid solution is less than 0.1 part by weight, an effect of intended corrosion resistance cannot be thoroughly exhibited. Meanwhile, even if the amount is more than about 30 parts by weight, the corrosion resistance is not more improved than in the less amount.

The oxide solid solution of formula (1) used in this invention comprises magnesium oxide, zinc oxide and aluminum oxide, wherein aluminum oxide is such that part of Mg or Zn in the structure of magnesium oxide and zinc oxide is replaced with aluminum. Accordingly, the crystal structure is amorphous, or magnesium oxide, or zinc oxide, or a solid solution of magnesium oxide and zinc oxide. Accordingly, when crystals are fixed by a powder X-ray diffraction method, only magnesium oxide and zinc oxide, or either of them is detected as a crystalline phase.

The oxide solid solution represented by formula (1) has a far smaller crystal particle diameter (less than about 200 Å) than magnesium oxide, zinc oxide or a calcined mixture of magnesium oxide and zinc oxide. This is because aluminum is dissolved in a divalent metallic oxide to inhibit crystallization or crystal growth of the divalent metallic oxide and further zinc oxide and magnesium oxide are dissolved in each other.

As the oxides are thus fine crystals, a markedly improved reaction rate to acid and halogen is shown and a neutralization capacity is high. It has been further discovered that the oxide solid solution shows adsorbability or absorbability to an alkali metallic ion such as sodium that is still another cause of corrosion.

In formula (1), x is $0.1<x<0.6$, preferably $0.2\leq x\leq 0.5$, more preferably, $0.25\leq x\leq 0.35$. When x is less than 0.1, the amount of aluminum dissolved is small and the improvement in corrosion resistance is therefore not enough. When x is more than 0.6, the dissolving limit of aluminum is exceeded to form aluminum oxide, decreasing the improvement in corrosion resistance.

The ratio y of zinc oxide and magnesium oxide is $0<y<1$, preferably $0.1 \leq y23\ 0.9$, more preferably $0.5 \leq y \leq 0.8$, most preferably $0.6 \leq y \leq 0.8$.

Generally, the more magnesium oxide is dissolved in zinc oxide or vice versa, the more the growth of their crystals is hindered to more increase corrosion resistance.

That the secondary particles formed by agglomerating crystals of the oxide solid solution are as small as possible is desirable for increasing the adhesion between the coated film and the substrate metal, enhancing corrosion resistance and improving appearance of the coated film. Accordingly, it is advisable that the average secondary particle diameter is not more than about 5 micrometers, preferably, not more than about 2 micrometers, most preferably not more than about 1 micrometer.

The average secondary particle diameter is measured by previously applying ultrasonic waves for 5 to 10 minutes and dispersing particles in water or an alcohol according to a microtrack method or a Coulter counter method.

As the oxide solid solution of formula (1) is white and a hiding power is low, coloration is freely conducted and an inherent color of a coloring agent is less impaired. Because the oxide solid solution of formula (1) is fine crystals, a BET specific surface area is high in most cases, ranging from about 50 to about 400 m²/g.

The oxide solid solution can be treated with a surface treating agent. Examples of such surface treating agent are higher fatty acids, anionic surface-active agents, silane coupling agents, titanate coupling agents and esters between glycerol and fatty acids. Specific examples of the surface treating agent include higher fatty acids such as stearic acid, oleic acid and lauric acid, anionic surface-active agents such as sodium stearate, sodium oleate and sodium laurylbenzenesulfonate, silane or titanate coupling agents such as vinyltriethoxysilane, gamma-methacryloxypropyltriethoxysilane, isopropyltriisostearoyl titanate and isopropyltridecylbenzenesulfonyl titanate; and glycerol fatty acid esters such as glycerol monostearate and glycerol monooleate.

The surface treatment of the oxide solid solution with the surface treating agent may be performed by mixing the powder of the oxide solid solution with the surface treating agent under stirring by means of a stong mixer such as a Henschel mixer when the surface treating agent is liquid or a solution in an alcohol or an organic solvent.

The amount of the surface treating agent used in the above surface treatment is properly variable. It is usually about 0.1 to 10 % by weight, most preferably about 0.5 to 5 % by weight, based on the weight of the oxide solid solution of formula (1). [Method for Producing the Oxide Solid Solution]

The oxide solid solution of formula (1) utilized as an active ingredient of the rust-proofing coating composition in this invention can be produced by adding an alkali such as sodium hydroxide or potassium hydroxide to an aqueous solution of e.g. chlorides, nitrates and sulfates of Zn, Mg and Al [satisfying the atomic ratios, $Zn:Mg=1-y:y$ $(0.1 \leq y \leq 0.9)$ and $Zn+Mg:Al=1-x:x(0.1<x<0.6)]$, coprecipitating them with the pH of about 8, then water-washing the precipitate, drying it and calcining the dried product at about 350° C. or higher.

EXPLANATION OF THE FILM-FORMING COMPONENT

The coating used in the rust-proofing coating composition of this invention is composed of a coating resin, a pigment, a dyestuff, a filler, other additives and an organic solvent or water. Examples of the coating are aminoalkyd resin coatings, oil-modified alkyd resin coatings, acrylic resin coatings, phenolic resin coatings, vinyl chloride resin coatings, epoxy resin coatings, polyester resin coatings, polyurethane resin coatings, silicone resin coatings, and mixtures of these coatings. The oxide solid solution used as the rust-proofing agent in this invention is present in the amount of about 0.1 to 30 % by weight, preferably about 1 to 10 % by weight.

The rust-proofing coating composition of this invention may contain, in addition to the coating and the oxide solid solution, at least one compound formed from a divalent, trivalent or tetravalent metal cation and an anion selected from phosphoric acid, phosphorous acid, boric acid, borophosphoric acid, borophosphorous acid and a mixture thereof. Specific examples of such compound are calcium phosphate, calcium borate, calcium phosphite, zinc phosphite, zinc phosphate, zinc borate, magnesium phosphite and a mixture thereof. These compounds help improve corrosion resistance of the coating composition.

Examples of the pigment and the filler are talc, silica, calcium sulfate, calcium carbonate, calcium silicate, titanium dioxide, iron oxide, mica, aluminum silicate, clay and a mixture thereof.

The coating may be oily, aqueous or powdery; it is most preferably oily or aqueous.

The rust-proofing coating composition of this invention exhibits the effect upon directly coating it on the metallic surface. Accordingly, when a multilayered coated film is made of undercoat, intermediate coat and topcoat, said composition is used as a coating for undercoat.

This invention is to provide also a coating method for preventing or inhibiting corrosion on a metallic surface which comprises coating the metallic surface with an rust-proofing coating composition containing an oxide solid solution represented by formula (1)

$$[(Zn)_{1-y}(Mg)_y]_{1-x}Al_xO_{1+x/2} \qquad (1)$$

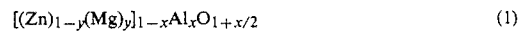

wherein x denotes a positive number satisfying $0.1<x<0.6$ and y denotes a positive number satisfying $0<y<1$.

EXPLANATION OF THE SUBSTRATE METAL

The metallic surface to which the rust-proofing coating composition of this invention is applied may be made of any metals that are exposed to corrosive environment or a combination of these metals. A typical metal is iron. When the metallic materials are used outdoors, they are exposed to wind and rain containing acids or salts and to an antifreezing agent on a road to cause corrosion. When they are placed indoors under high humidity, corrosion likewise occurs.

The following Examples and Comparative Examples illustrate this invention more specifically.

The tests on various properties were carried out as follows.

Test on corrosion by a salt water spray method:

A cut having a width of about 1/16 to 3/32 inch reaching the metallic substrate was formed on the coated film of the coated metallic substrate to expose the metallic substrate to view. A 5 % aqueous sodium chloride solution was sprayed in splash at 25° C. The sprayed substate was then exposed to an atmosphere having a temperature of 25° C. and a relative humidity of 80% for 42 days. The maximum length of the corrosion which occurred at the cut part was measured, and made a measure of corrosion.

Test on adhesion of the coated film:

The coated film was provided with 1 x 1 mm crosscuts, and peeled off with a cellophane adhesive tape, thereby evaluating a degree of delamination.

Test on humidity resistance of the coated film:

The coated metallic substrate was left to stand in an atmosphere having a temperature of 50° C. and a a relative humidity of 98% for 240 hours. The coated film was then provided with 1×1 mm crosscuts, and peeled off with a cellophane adhesive tape, thereby evaluating a degree of delamination. In the evaluation, 0/100 means that the coated film was entirely peeled off, and 100/100 means that it was not peeled off at all.

Test on sedimentation:

Two hundred millimeters of the prepared rust-proofing coating was placed in a 200 ml measuring cylinder and left to stand for 48 hours. Sedimentation of the rust-proofing agent on the bottom of the cylinder was observed, and evaluated as follows.
1: no sedimentation
2: little sedimentation (No practical trouble occurs)
3: slight sedimentation (no practical trouble occurs)
4: appreciable sedimentation
5: heavy sedimentation

EXAMPLE 1

Magnesium chloride, zinc nitrate and aluminum chloride were dissolved in water to prepare 3 liters of a mixed aqueous solution containing 0.16 mol/liter of zinc, 0.64 mol/liter of magnesium and 0.2 mol/liter of aluminum. This aqueous solution was heated to 40° C., and 3 mols/liter of sodium hydroxide heated to about 40° C. was added under stirring until pH was raised to about 10.

The thus obtained white precipitate was dehydrated by vacuum filtration, and then washed with about 1.2 liters of a 0.5 mol/liter sodium carbonate aqueous solution and further with about 5 liters of deionized water. The white precipitate was dried, calcined in air at 400° C. for 2 hours, pulverized and classified. The chemical composition, the BET specific surface area and the average secondary particle diameter measured by a microtrack method of the resulting oxide solid solution are shown in Table 1.

Subsequently, 10 parts by weight of the powder of the oxide solid solution was added to 100 parts by weight of a xylene solvent, treated for about 30 minutes with a homomixer and uniformly dispersed. Two parts by weight of the dispersion was added to 100 parts by weight of a film-forming component of a commercial baking-type acrylic paint (film-forming component 50%) to prepare a rust-proofing coating. The coating was adjusted to a viscosity suitable for spray-coating by adding a thinner thereto, and spray-coated onto a 0.8 millimeter-thick steel sheet to a dry film thickness of about 50 micrometers. The coated sheet was baked at 140° C. for 30 minutes. The salt water spray test was conducted as above for this coated sheet. The result (maximum length of corrosion) is shown in Table 1.

EXAMPLES 2 TO 4

Oxide solid solutions shown in Table 1 were prepared as in Example 1 except that a Zn:Mg:Al molar ratio was changed as shown in Table 1. The salt water spray test was conducted as in Example 1. The results are shown in Table 1.

COMPARATIVE EXAMPLE 1

The same paint as used in Example, to which the oxide solid solution as a rust-proofing agent was not added, was coated and baked as in Example 1. The salt water spray test was then conducted as in Example 1, and the result is shown in Table 1.

EXAMPLES 5 & 6

Magnesium chloride, zinc chloride and aluminum sulfate were dissolved in water to provide 4 liter of a mixed aqueous solution containing 0.20 mol/liter of zinc, 0.80 mol/liter of magnesium and 0.4 mol/liter of aluminum. This solution was charged in a 10-liter stainless steel cylindrical reaction vessel, and the temperature was adjusted to about 30° C. While the solution was stirred by a chemistirrer, 3 mols/liter of a sodium hydroxide aqueous solution adjusted to about 30° C. was added until pH of the solution was raised to about 9.5.

The resulting slurry containing the white precipitate was filtrated in vacuo, and then washed with about 20 liters of a 0.5 mol/liter sodium carbonate aqueous solution and further with about 5 liters of deionized water. The washed substance was dispersed in deionized water. The dispersion was placed in a 50 liter-autoclave, and treated with hot water at 120° C. (Example 5) or at 150° C. (Example 6) for 10 hours. The treated substances were then dehydrated, dried, pulverized and baked in air at 450° C. for 2 hours. A chemical composition, a BET specific surface area and an average secondary particle diameter from a particle diameter distribution according to a microtrack method were measured for the resulting oxide solid solutions. The results are shown in Table 1. A powder X-ray diffraction was measured and it was found that the diffraction pattern of magnesium oxide alone was observed in both the calcined products. Accordingly, in these products, zinc oxide and aluminum oxide were dissolved in magnesium oxide.

TABLE 1

| | Oxide solid solution | | | | Coated film | | Sedimentation of coated film |
|---|---|---|---|---|---|---|---|
| | Chemical composition | Average secondary particle diameter (micrometer) | BET specific surface area ($m^2/g$) | Maximum length of corrosion (mm) | Adhesion | Humidity resistance | |
| Example | | | | | | | |
| 1 | $[Zn_{0.2}Mg_{0.8}]_{0.8}Al_{0.2}O_{1.1}$ | 1.4 | 121 | 0.9 | 100/100 | 90/100 | 3 |
| 2 | $[Zn_{0.5}Mg_{0.5}]_{0.7}Al_{0.3}O_{1.15}$ | 1.9 | 256 | 0.5 | 100/100 | 100/100 | 1 |
| 3 | $[Zn_{0.8}Mg_{0.2}]_{0.6}Al_{0.4}O_{1.2}$ | 1.2 | 150 | 0.6 | 100/100 | 95/100 | 2 |

TABLE 1-continued

| | Oxide solid solution | | | | Coated film | | Sedimentation of coated film |
| --- | --- | --- | --- | --- | --- | --- | --- |
| | Chemical composition | Average secondary particle diameter (micrometer) | BET specific surface area (m²/g) | Maximum length of corrosion (mm) | Adhesion | Humidity resistance | |
| 4 | $[Zn_{0.4}Mg_{0.6}]_{0.5}Al_{0.5}O_{1.25}$ | 1.7 | 310 | 0.8 | 100/100 | 80/100 | 3 |
| 5 | $[Zn_{0.2}Mg_{0.8}]_{0.71}Al_{0.29}O_{1.145}$ | 0.4 | 297 | 0.3 | 100/100 | 100/100 | 1 |
| 6 | $[Zn_{0.2}Mg_{0.8}]_{0.71}Al_{0.29}O_{1.145}$ | 0.6 | 164 | 0.4 | 100/100 | 100/100 | 1 |
| Comparative Example | | | | | | | |
| 1 | | | | 3.0 | 100/100 | 20/100 | — |

EXAMPLE 7

Magnesium sulfate, zinc sulfate and aluminum nitrate were dissolved in water to prepare an aqueous solution of about 30° C. containing 0.2 mol/liter of zinc, 0.46 mol/liter of magnesium and 0.34 mol/liter of aluminum. Four mols/liter of a potassium hydroxide aqueous solution was formed and heated to 30° C. Four liters of both the solutions was continually fed to a 10-liter stainless steel cylindrical reaction vessel at rates of about 100 ml/min. and 25 ml/min. through a metering pump. By adjusting the amount of alkali, pH of the reaction system was maintained at about 8.8 to 9.0. The thus obtained reaction product containing the white precipitate was dehydrated and then washed with about 3 liters of a 0.5 mol/liter sodium oxalate aqueous solution to remove sulfuric acid ions almost completely, followed by fully washing the residue with deionized water. The water-washed product was dehydrated, dried and calcined at about 500° C. for 1 hour. The resulting product was pulverized and classified. The calcined product had the chemical composition $[Zn_{0.3}Mg_{0.7}]_{0.64}Al_{0.34}O_{1.16}$, the BET specific surface area of 260 m²/g and the average secondary particle diameter of 0.8 micrometer. The powder of the oxide solid solution was dispersed in a coating thinner as in Example 1. The dispersion in an amount shown in Table 2 was added to 100 parts by weight of a commercial aminoalkyd paint (nonvolatile content 60 %). The mixture was then adjusted to a viscosity suitable for spray-coating by further adding a thinner thereto, and spray-coated onto a 0.8 millimeter-thick steel sheet (amount of adhesion 2 g/m²) chemically treated with zinc phosphate to a dry film thickness of about 40 micrometers. The coated plate was baked at 140° C. for 30 minutes. The aforesaid salt water spray test was performed for the resulting coated sheet. The results are shown in Table 2.

COMPARATIVE EXAMPLE 2

The same paint as used in Example 7, to which the oxide solid solution was not added, was coated and baked as in Example 7. The salt water spray test was conducted, and the result is shown in Table 2.

TABLE 2

| | Amount of the oxide solid solution per 100 parts by weight of the film-forming component (parts by weight) | Maximum length of corrosion (mm) |
| --- | --- | --- |
| Example 7-1 | 1 | 0.9 |
| Example 7-2 | 5 | 0.6 |
| Example 7-3 | 10 | 0.5 |
| Example 7-4 | 20 | 0.5 |
| Comparative Example 2 | | 2.8 |

What we claim is:

1. A rust-proofing agent containing as an active ingredient an oxide solid solution represented by formula (1)

$$[(Zn)_{1-y}(Mg)_y]_{1-x}Al_xO_{1+x/2} \qquad (1)$$
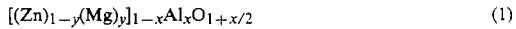

wherein x denotes a positive number satisfying $0.1 < x < 0.6$ and y denotes a positive number satisfying $0 < y < 1$.

2. The rust-proofing agent of claim 1 wherein x is a positive number satisfying $0.2 \leq x \leq 0.5$.

3. The rust-proofing agent of claim 1 wherein x is a positive number satisfying $0.25 \leq x \leq 0.35$.

4. The rust-proofing agent of claim 1 wherein y is a positive number satisfying $0.5 \leq y \leq 0.8$.

5. The rust-proofing agent of claim 1 wherein y is a positive number satisfying $0.6 \leq y \leq 0.8$.

6. The rust-proofing agent of claim 1 wherein an average secondary particle diameter of the oxide solid solution is not more than about 5 micrometers.

7. The rust-proofing agent of claim 1 wherein the average secondary particle diameter of the oxide solid solution is not more than about 2 micrometers.

8. The rust-proofing agent of claim 1 wherein the average secondary particle diameter of the oxide solid solution is not more than about 1 micrometer.

9. A rust-proofing coating composition containing
  (a) a coating and
  (b) an oxide solid solution represented by formula (1)

$$[(Zn)_{1-y}(Mg)_y]_{1-x}Al_xO_{1+x/2} \qquad (1)$$
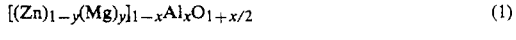

wherein x denotes a positive number satisfying $0.1 < x < 0.6$ and y denotes a positive number satisfying $0 < y < 1$.

10. The rust-proofing coating composition of claim 9 wherein x is a positive number satisfying $0.2 \leq x \leq 0.5$.

11. The rust-proofing coating composition of claim 9 wherein x is a positive number satisfying $0.25 \leq x \leq 0.35$.

12. The rust-proofing coating composition of claim 9 wherein y is a positive number satisfying $0.5 \leq y \leq 0.8$.

13. The rust-proofing coating composition of claim 9 wherein y is a positive number satisfying $0.6 \leq y \leq 0.8$.

14. The rust-proofing coating composition of claim 9 wherein an average secondary particle diameter of the oxide solid solution is not more than about 5 micrometers.

15. The rust-proofing coating composition of claim 9 wherein the average secondary particle diameter of the oxide solid solution is not more than about 2 micrometers.

16. The rust-proofing coating composition of claim 9 wherein the average secondary particle diameter of the oxide solid solution is not more than about 1 micrometer.

17. A coating method for preventing or inhibiting corrosion of a metallic surface which comprises coating the metallic surface with a rust-proofing coating composition containing an oxide solid solution represented by formula (1)

$$[(Zn)_{1-y}(Mg)_y]_{1-x}Al_xO_{1+x/2} \qquad (1)$$

wherein x denotes a positive number satisfying $0.1 < x < 0.6$ and y denotes a positive number satisfying $0 < y < 1$.

* * * * *